Dec. 9, 1969    P. J. DESNOYERS    3,482,683
PRESSURE SENSITIVE TAPE
Filed Oct. 22, 1965

INVENTOR.
PAUL DESNOYERS
BY
Charles A. Harris
ATTORNEY

United States Patent Office 3,482,683
Patented Dec. 9, 1969

3,482,683
PRESSURE SENSITIVE TAPE
Paul J. Desnoyers, Somerville, N.J., assignor to Johnson
& Johnson, a corporation of New Jersey
Filed Oct. 22, 1965, Ser. No. 502,014
Int. Cl. B65h 55/00, 75/02
U.S. Cl. 206—59                                    4 Claims

ABSTRACT OF THE DISCLOSURE

A thin, flexible normally tacky and pressure-sensitive bundling tape having relatively high longitudinal extensibility and high resistance to crosswise tearing forces, which comprises a relatively thin backing film, a normally tacky and pressure-sensitive adhesive coating on one major surface of said film and a delamination resistant secondary layer united to the other major surface of said film. Said film comprises a hypermolecularly oriented linear crystalline polyolefin film consisting essentially of molecular chains which are predominantly oriented lengthwise of the tape in the form of a series of longitudinally extending fibrous polyolefinic elements which are coherently assembled in said film and undistinguishable to the naked eye in their normal position in said film. The secondary layer possesses a lengthwise resistance to tearing which is greater than the lengthwise resistance to tearing of the backing film, and the tape is wound upon itself in the form of a roll with the adhesive coating facing inwardly and the secondary layer facing outwardly so that the inner surface of the adhesive coating is in contact with the secondary layer in successive convolutions of the roll. As a result, a flexible bundling tape is provided which has high resistance to crosswise tearing forces and high longitudinal extensibility and which will not delaminate, split or fibrillate when unwound from the roll.

---

This invention relates to pressure sensitive adhesive tapes and, more particularly, to pressure sensitive adhesive tapes adapted for use in bundling and strapping applications.

Pressure sensitive adhesive bundling tapes are well known in the art, such as, for example, those disclosed in U.S. Patents 2,750,315 and 2,750,030 to Tierney and U.S. Patent 2,750,314 to Bemmels. These tapes are employed for bundling together a plurality of objects by tightly pulling the tape around the objects at one or more places to form adhesive bonded straps. The articles bundled together may range from heavy and bulky objects such as metal pipes, rods, bars and cables, which are being shipped or stored, to small consumer packages bundled together for unit retailing. These tapes are also useful for the joining together of multiple parts where the joints must withstand considerable force, such as the splice joint of heavy electrical cables.

Pressure sensitive adhesive strapping tapes have numerous advantages over steel straps and wires in the bundling of heavy and bulky articles. The tape is more flexible and is easier to cut into desired lengths and easier to apply. It is selfholding and the adhesive straps cannot slip after application, thus minimizing the shifting of the articles that are bundled together. Pressure sensitive adhesive straps are better adapted to binding small retail packages together than are string or rubber bands. They are stronger and bonded to the packages and, therefore, are relatively tamper proof.

Bundling tapes should have good tensile strength in the lengthwise direction but, most importantly, must have a relatively high resistance to tearing in the crosswise direction so as to prevent the crosswise tearing of the adhesive tape strap when the strap is subjected to sheering stresses or is punctured by a sharp object as often occurs during handling and transportation. The tape should also be relatively thin, flexible, and extensible so as to permit a snug fit and insure intimate contact between the pressure sensitive adhesive surface and the surface of the bundled objects, independent of the shape of the objects. A transparent bundling tape is preferred for many applications so that it will not interfere substantially with the visibility of underlying printed information.

The pressure senstive adhesive bundling tapes now in general use normally comprise a backing layer, a pressure sensitive adhesive layer, and an adhesive saturated series of parallel glass or organic strands embedded in the the adhesive layer and integrally bonded to the backing. These strand reinforced tapes possess high longitudinal tensile strength and high resistance to tearing in the crosswise direction. However, due to their nature these tapes must be assembled from a number of components in a somewhat complex manufacturing operation such as as that described in U.S. Patent No. 2,750,030 to Tierney. Furthermore, the use of strands to impart high strength and tear resistance to these tapes impairs somewhat their optical clearness and flexibility. In addition, certain of these tapes have very low lengthwise extensibility due to the properties of the strands incorporated into the tape.

According to this invention, an inexpensive pressure adhesive bundling tape is provided in which the use of individual sensitive strands or filaments and the problems associated therewith are avoided. These novel tapes have a backing comprising a hypermolecularly oriented linear crystalline polyolefin film consisting essentially of molecular chains predominantly oriented in the lengthwise direction of the tape. The hypermolecularly oriented film comprises a series of longitudinally extending fibrous polyolefinic elements coherently assembled in the film. These polyolefinic elements, which cannot be distinguished by the naked eye in their normal position in the film, provide the tape with many of the properties of the prior art strand reinforced tapes. This invention eliminates the somewhat complicated method of production of the prior art pressure sensitive adhesive bundling tapes, including individual fiber handling, and provides a simple low cost method of production. The cost of materials also is low since the linear crystalline hypermolecularly oriented fibrous polyolefin film utilized in the tapes of this invention is relatively inexpensive. By virtue of the elimination of the filaments, thinner tapes can be produced, the flexibility and optical clearness of pressure sensitive adhesive bundling tapes are markedly improved, and an extensibility is provided which was unavailable in certain of the prior art tapes.

In the preferred embodiment of this invention, the hypermolecularly oriented fibrous film is united to a secondary layer consisting of a film or a delamination resistant unified fiborus web which has higher resistance to tearing in the lengthwise direction than the hypermolecularly oriented fiborus film in order to prevent the tape from splitting lengthwise when subjected to crosswise tearing forces and to prevent the tape from splitting, delaminating, or fibrillating when it is unwound from a roll for use.

The inventive concept may be more easily understood by reference to the following descriptions and attached drawings, wherein, FIG. 1 is a greatly magnified schematic plan view of a hypermolecularly oriented linear crystalline fibrous polyolefin film in which the direction of molecular orientation is in the lengthwise direction, as indicated by the arrow.

Figure 1:
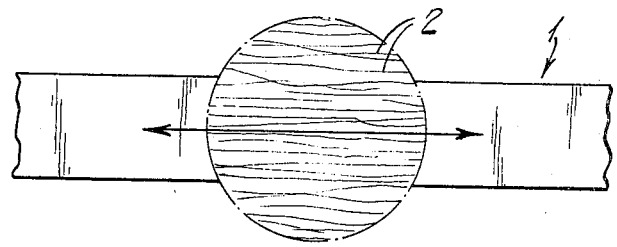

Referring now to FIG. 1, there is illustrated a hypermolecularly oriented linear crystalline polyolefin film 1 in which essentially all of the molecular chains are predominanty oriented in the lengthwise direction. The film comprises a series of longitudinally extending fibrous polyolefinic elements 2 coherently assembled in the film. The fibrous polyolefinic elements, which in their normal position in the film are undistinguishable to the naked eye, provide the tape with suitable tensile strength in the lengthwise direction of the film and, in the preferred embodiment of the invention, a relatively high resistance to tearing in the crosswise direction of the film.

The hypermolecularly oriented fibrous films described above have been found to be further characterized generally by a tensile strength in the lengthwise direction of at least about 20,000 pounds per square inch, a ratio of the elongation at break in the lengthwise direction to the elongation at break in the crosswise direction of at least about 10 to 1 and a corresponding tensile strength ratio of at least about 3 to 1.

While it is believed that any hypermolecularly oriented linear crystalline polyolefinic film comprising the above described polyolefinic elements will satisfy the basic concept of this invention, polyethylene, polypropylene or ethylene-propylene copolymer films having these characteristics have been found to be advantageous for this purpose.

Pressure sensitive adhesive bundling tapes can be produced by applying a pressure sensitive adhesive coating to one surface of one of these hypermolecularly oriented fibrous films. Tapes so formed possess high extensibility in the lengthwise direction and do not readily tear in the crosswise direction; however, they have a tendency to split lengthwise when subjected to crosswise tearing forces.

Resistance to tearing is measured by puncturing the tape in the exact center and positioning the hole thus made over the vertex of a thin right angle triangular plate. The ends of the tape are then pulled downward over the thin triangular plate and the force necessary to cause rupturing of the tape is measured. This procedure will be described more fully later in the specification. The tear resistance in the crosswise direction of the film is measured by positioning the base of the triangular plate in the crosswise direction. When it is attempted to measure the crosswise resistance to tearing of tapes made from films thus far investigated having the properties hereinbefore described, the tape tears or splits in the lengthwise direction before any crosswise tearing begins. Thus, while the tape does not readily tear in the crosswise direction, it is not highly resistant to crosswise tearing forces. This tendency to split is also evident when it is attempted to unwind the tape rapidly from a roll, some of the fibrous polyolefinic elements tending to delaminate and tear away from the film and remain adhered to the adjacent surface. Such a tape is nevertheless a useful bundling tape in that it will not readily tear in the crosswise direction, has a moderate tensile strength in the lengthwise direction, is relatively thin and flexible, and possesses a high longitudinal extensibility.

It has been found that this premature tearing or splitting in the lengthwise direction when the film is subjected to a tearing force in the crosswise direction can be eliminated by uniting one surface of the oriented film to a secondary layer comprising a film or a unified fibrous web more resistant to tearing in the lengthwise direction than the hypermolecularly oriented fibrous film. This increase in the tear resistance in the lengthwise direction is, of course, also desirable in itself.

For the above reasons, the preferred embodiments of the tapes of this invention utilize a laminated backing comprising the before-mentioned hypermolecularly oriented fibrous films united to a secondary layer which is either a film or a unified fibrous web having good resistance to tearing in the lengthwise direction. This secondary film may, for example, be polyethylene, polypropylene, polycarbonate, polyvinyl chloride, polyvinyl acetate or any of the conventiona relatively unoriented organic films. The unified fibrous web may, for example, be an adhesive impregnated paper.

Figure 2:
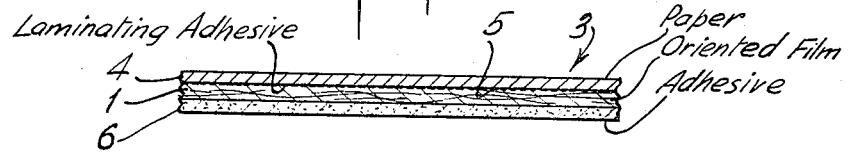
FIG. 2 is an enlarged schematic cross sectional view of a pressure sensitive adhesive bundling tape according to this invention taken along the longitudinal axis.

Referring now to FIG. 2, there is shown an example of the preferred embodiment of the pressure sensitive adhesive bundling tapes 3 of this invention. An adhesive impregnated paper sheet 4 is united to one surface of the hypermolecularly oriented linear crystalline fibrous polyolefin films 1 previously described by the means of an intermediate pressure sensitive adhesive layer 5. A pressure sensitive adhesive coating 6 is present on the outer surface of the hypermolecularly oriented linear crystalline fibrous polyolefin film. While either pressure sensitive laminating adhesive or thermoplastic laminating adhesive may be used, the oriented film and the secondary layer must be united by adhesive means since a direct heat lamination causes the hyperoriented molecular configuration to break down into a more randomly oriented configuration, thus destroying the longitudinally extending fibrous polyolefinic elements. In addition, the direct heat lamination of a hypermolecularly oriented fibrous film to a film that is randomly oriented often actually results in a tape with a resistance to tearing in the lengthwise direction which is less than the resistance to tearing in the lengthwise direction of the oriented film.

The adhesive lamination may be carried out by either wet or dry laminating processes and both high modulus and low modulus adhesives may be utilized. However, the latter is preferred in that the tear resistance of the tape will be further increased by a layer of low modulus adhesive. The best laminating results are obtained when a primer layer is interposed between the film and the laminating adhesive. It is also advisable to use an electrostatic or chemically treated film to improve the quality of the lamination.

Figure 3:
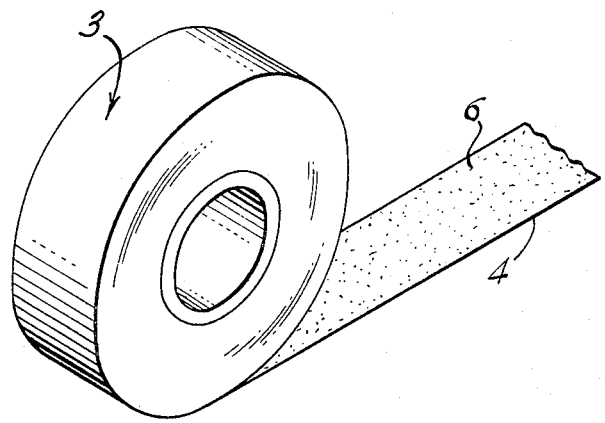
FIG. 3 is a view in perspective of the pressure sensitive adhesive tape of FIG. 2 wound on itself in the form of a roll.

FIG. 3 illustrates the pressure sensitive adhesive tape 3 of FIG. 2 wound on itself in roll form with the pressure sensitive adhesive coat 6 facing the axis of the roll and the secondary paper layer 4 which is resistant to delamination, positioned outwardly of the oriented film 1. When such a tape is unwound from the roll, the fibrous polyolefinic elements of the hypermolecularly oriented film do not fibrillate and the tape does not delaminate or split. Embodiments in which the pressure sensitive adhesive coating is present on the outer surface of the secondary layer should be avoided since when such a tape is wound on itself in roll form, the pressure sensitive adhesive layer must release from the hypermolecularly oriented fibrous film layer when the tape is unwound for use. When such an embodiment made of films thus far investigated is unwound, the tape tends to split and fibrillate even when the hypermolecularly oriented film is coated with a release agent.

Flexible, thin, relatively transparent, pressure sensitive adhesive bundling tapes of this invention having a thickness of less than 5 mils can be produced which have a tensile strength of 31,000 pounds or more per square inch in the lengthwise direction, based on the thickness of the backing film, and a resistance to tearing in the crosswise direction of 15 pounds or more. These tapes, preferably, have an extensibility at break of 45% or more in the lengthwise direction.

Hypermolecularly oriented fibrous films of any thickness up to 5 mils may be used in the tapes of this invention and, of course, as the thickness increases, the tensile strength in the lengthwise direction and the resistance to tearing in the crosswise direction also increases. Since it is more difficult to hypermolecularly orient the thicker films, the greatest tensile strength and resistance to tearing per mil thickness and, therefore, the greatest advantage of the tapes of this invention, is obtained by the use of an oriented film having a thickness of between 1 and 1½ mils. Thus, an extremely thin, tear resistant bundling tape may be produced.

Any conventional pressure sensitive adhesive may be used to impart the pressure sensitive adhesive properties to these tapes. While a heat sensitive adhesive could be used, its activation would, as previously described, cause some breakdown in molecular orientation. Thus, much of the advantages of the tapes of this invention would be lost.

The adhesive coating can be applied by any of the conventional processes such as coating or calendering. When the adhesive coating is applied to the hypermolecularly oriented film, the film should preferably be pretreated chemically or electrostatically and a primer layer used.

The following examples are given to illustrate the features of bundling tapes of this invention. They should in no way be construed to limit the scope of the invention.

EXAMPLE I

A pressure sensitive adhesive composition comprising by dry weight, 31.5 parts smoke sheet; 35.7 parts of a synthetic isotactic polyisoprene polymer (Mooney viscosity ML–4 at 212° F. of 80); 32.8 parts of a styrene-butadiene copolymer (23% styrene, 72% butadiene, having a Mooney viscosity ML–4 at 212° F. of from 50 to 58); 40.0 parts of a beta pinene polymer resin (M.P. of 150° C. by the ball and ring method); 9.5 parts of a phenol modified polyterpine resin (M.P. of 110°–120° C. by the ball and ring method); 7.6 parts zinc resinate (1.2 CaOH equivalent, 11.8% zinc oxide, having a M.P. of 150–156° by the ball and ring method); 1.25 parts of a ditertiary amyl-hydroquinone antioxidant; 1.25 parts of a ditertiary butyl cresol; and 6.0 parts of the polymerization product of essentially indene still residues modified with small amounts of styrene and butadiene (having a M.P. of 118° F. by the ball and ring method), is calender coated at a dry coating weight of 1.50 oz. per square yard on one surface of a one mil thick linear crystalline hypermolecularly oriented ethylene-propylene copolymer film in which essentially all of the molecular chains are predominantly oriented in the lengthwise direction and which comprises a series of longitudinally extending polyolefinic elements, having a density of 0.93, an elongation at break ratio of 33/1, a tensile strength ratio of 7/1 and a lengthwise tensile strength of 31,000 pounds per square inch (E.P.S.–120 H.S. made by Eastman Kodak). The coated film is cut into test strips 8 inches in the lengthwise direction by one inch in the crosswise direction. The tensile strength and elongation at break in both the lengthwise direction and the crosswise direction are measured on a strain gauge type tensile machine with an initial jaw separation of 6 inches and a lower jaw speed of 5 inches per minute. The tape is found to have a tensile strength of 31,000 pounds per square inch in the lengthwise direction and a tensile strength of 4,300 pounds per square inch in the crosswise direction, based on the thickness of the backing film, and has an elongation of 45.8% in the lengthwise direction at the moment of break.

A 4" x 1" sample is cut from an 8" x 1" sample and tested for resistance to tearing in both the lengthwise direction and the crosswise direction in the following manner. A ¼" diameter hole is punched in the exact center of the sample and a ¼" rod is threaded through the hole. One end of the rod is fastened in the upper jaw of the strain gauge type tensile machine while the other end of the rod is fastened to the 90° vertex of a right angle triangular plate which is ⅟₁₆" thick and has ⅟₃₂" radius rounded polished edges. The rod is attached to the 90° vertex of the right triangle by the use of a ⅟₁₆" diameter pin passing through the diameter of the rod and through a hole drilled through the triangular plate near the vertex of the right angle. The ends of the tape sample are placed in the lower jaws of the tensile machine without tension; thus, as the jaws of the tensile machine move away from each other the triangle is pulled through the hole punched into the tape sample with the right angle of the triangle leading the way. The tear resistance in the lengthwise direction is measured by positioning the triangular plate so that its base is disposed in the lengthwise direction. A lower jaw speed of 1" per minute is used. A strain of 0.4 pound is registered before tearing begins in the lengthwise direction.

The resistance to tearing in the crosswise direction is measured by positioning the base of the triangle in the crosswise direction and repeating the above procedure. A strain of 2.5 pounds is registered before rupturing of the tape occurs; however, rather than the rupture of the tape being in the form of a tear in the crosswise direction, the tape tears or splits in the lengthwise direction before crosswise tearing begins. The tape thus produced is a useful bundling tape which has moderate tensile strength in the lengthwise direction and will not readily tear in the crosswise direction. It also possesses high extensibility in the lengthwise direction and is flexible and transparent.

EXAMPLES II AND III

The ethylene-propylene copolymer film used in Example I is united to a 30# crepe paper impregnated to 60% of the paper weight with an adhesive consisting of equal weights of a styrene-butadiene copolymer (50% styrene, 50% butadiene) and an acrylonitrile copolymer (32% acrylonitrile and 68% butadiene). The paper layer is calender coated at a dry coating weight of 2.0 oz./yd.² with a laminating adhesive composition comprising, by dry weight, 100 parts of pale crepe; 80 parts of a beta pinene polymer resin (M.P. 115° C. by ball and ring); 12 parts zinc resinate; 12 parts of heat reacting octyl phenol formaldehyde resin; 1 part Butyl Zimate (zinc dibutyl dithiocarbamate); and 1 part of a 2,5 ditertiary amyl-hydroquinone antioxidant. The impregnated crepe paper itself has a tear resistance of 2 lbs. along each axis. Another sheet of ethylene-propylene copolymer is united to a one mil thick "Mylar" polyester film using the same laminating adhesive at the same coating weight. This "Mylar" film has a tear resistance of 2.5 lbs. in the lengthwise direction and 6.0 lbs. in the crosswise direction.

The outer surface of the oriented ethylene-propylene copolymer film of each of the laminates is coated with the same pressure sensitive adhesive mass as used in Example I at a dry coating weight of 1.50 oz./yd.². The laminated sheets are again cut into 8" x 1" strips and the resistance to tearing measured using the procedure of Example I.

The resistance to tearing in the lengthwise direction of the tape having the secondary paper layer is found to be 4.5 pounds and the resistance to tearing in the crosswise direction is found to be 15.3 pounds. The corresponding resistances to tearing of the tape having the secondary film layer are found to be 2.4 and 11.8 pounds respectively. In each case the tape tears in the crosswise direction when crosswise tearing forces are applied and does not split lengthwise. The tapes produced are thin and flexible, have a moderate lengthwise tensile strength, and possess relatively high crosswise tear resistance. When the tapes are wound on themselves in the form of a roll with the adhesive coating facing the axis of the roll, delamination and fibrillation do not occur when the tape is rapidly unwound from the roll for use.

While in the specification, drawings, and examples, various specific embodiments of pressure sensitive adhesive bundling tapes have been described, they have been included only to illustrate the invention.

What is claimed is:

1. A thin flexible normally tacky and pressure-sensitive bundling tape having a relatively high longitudinal extensibility and high resistance to crosswise tearing forces which comprises a relatively thin flexible fibrous backing film; a normally tacky and pressure-sensitive adhesive coating on one major surface of said backing film; and a delamination resistant coherent secondary layer united to the other major surface of said film by a laminating adhesive layer, said secondary layer possessing a lengthwise resistance to tearing which is greater than the lengthwise resistance to tearing of the film; said backing being a hypermolecularly oriented linear crystalline polyolefin film consisting essentially of molecular chains which are predominantly oriented lengthwise of the tape and having a ratio of lengthwise elongation at break to crosswise elongation at break of substantially greater than 1 to 1, said film comprising a series of longitudinally extending fibrous polyolefinic elements coherently assembled in said film and said fibrous elements being undistinguishable to the naked eye in their normal position in said film; said tape being wound upon itself in roll form with the adhesive coating facing inwardly toward the axis of the roll and the secondary layer facing outwardly so that the inner surface of said adhesive coating is in contact with said secondary layer in successive convolutions of said roll; whereby a flexible bundling tape is provided which has high resistance to crosswise tearing forces and which will not delaminate, split or fibrillate when unwound from the roll.

2. A normally tacky and pressure sensitive adhesive tape according to claim 1, wherein the hypermolecularly oriented film has a tensile strength in the lengthwise direction of at least about 20,000 pounds per square inch and a ratio of lengthwise elongation at break to crosswise elongation at break of at least about 10 to 1 and a ratio of lengthwise tensile strength to crosswise tensile strength of at least about 3 to 1.

3. A pressure sensitive adhesive tape according to claim 1, wherein said hypermolecularly oriented linear crystalline polyolefin film is selected from the group consisting of polypropylene, polyethylene and ethylene-propylene copolymer films.

4. A pressure sensitive adhesive tape according to claim 1, wherein the secondary layer is a delamination resistant unified fibrous web.

References Cited

UNITED STATES PATENTS

| 2,631,954 | 3/1953 | Bright | 161—167 |
| 3,179,552 | 4/1965 | Hauser et al. | 161—402 X |
| 3,024,152 | 3/1962 | Klug | 161—144 |
| 3,322,613 | 5/1967 | Rasmussen | 264—288 |

ROBERT F. BURNETT, Primary Examiner

LINDA M. CARLIN, Assistant Examiner

U.S. Cl. X.R.

117—122; 161—167, 402